(12) United States Patent
Hosie et al.

(10) Patent No.: US 10,277,489 B2
(45) Date of Patent: *Apr. 30, 2019

(54) PROVIDING DYNAMIC LATENCY IN AN INTEGRATION FLOW

(71) Applicant: International Business Machines Corporation, Armonk, NY (US)

(72) Inventors: John Hosie, Eastleigh (GB); Martin A. Ross, Gosport (GB); Craig H. Stirling, Winchester (GB); Dominic J. Storey, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,350

(22) Filed: Sep. 20, 2018

(65) Prior Publication Data
US 2019/0020560 A1  Jan. 17, 2019

Related U.S. Application Data

(63) Continuation of application No. 14/947,307, filed on Nov. 20, 2015.

(51) Int. Cl.
*G06F 15/173* (2006.01)
*H04L 12/26* (2006.01)
(Continued)

(52) U.S. Cl.
CPC ........ *H04L 43/0852* (2013.01); *G06F 9/5033* (2013.01); *H04L 41/5009* (2013.01)

(58) Field of Classification Search
CPC ............. H04L 43/0858; H04L 41/5009; G06F 9/5033
(Continued)

(56) References Cited

U.S. PATENT DOCUMENTS 7,289,964 B1  10/2007  Bowman-Amuah
8,620,989 B2  12/2013  Eisner et al.
(Continued)

FOREIGN PATENT DOCUMENTS

CN  102402507 A  4/2012

OTHER PUBLICATIONS

IBM, "WebSphere ESB", IBM WebSphere Application Server Performance Cookbook, printed Jul. 16, 2018, 7 pages.
(Continued)

*Primary Examiner* — David R Lazaro
*Assistant Examiner* — Mariegeorges A Henry
(74) *Attorney, Agent, or Firm* — Stosch Sabo

(57) ABSTRACT

Providing dynamic latency in an integration flow. An integration flow connecting multiple integration nodes and including at least one repeat node is managed, wherein a repeat node repeats by sending a message, a variation of a message, or an element of a message to multiple paths or to a single path multiple times. A repeat node is registered with a workload manager component for monitoring. Data relating to the effect on performance by the integration flow including the monitored repeat node is collected. Required latencies or variations of latencies between firing of repeats of the repeat node based on the collected data are determined. The latencies or variations of latencies between firing of the repeats of the repeat node are instructed to influence dynamically a flow of elements through the repeat node.

20 Claims, 5 Drawing Sheets

(51) Int. Cl.
*H04L 12/24* (2006.01)
*G06F 9/50* (2006.01)

(58) Field of Classification Search
USPC .................................................. 709/223, 224
See application file for complete search history.

(56) References Cited

U.S. PATENT DOCUMENTS

| | | | |
|---|---|---|---|
| 8,701,128 | B2 | 4/2014 | Salt et al. |
| 9,154,394 | B2 * | 10/2015 | Ko ..................... H04L 43/0858 |
| 2007/0066311 | A1 | 3/2007 | Reibel et al. |
| 2007/0271570 | A1 * | 11/2007 | Brown .................. G06F 9/5033 |
| | | | 718/105 |
| 2012/0143634 | A1 | 6/2012 | Beyda et al. |
| 2013/0086631 | A1 | 4/2013 | Archer et al. |
| 2014/0059204 | A1 | 2/2014 | Nguyen et al. |
| 2015/0147990 | A1 | 5/2015 | Kreitzer et al. |
| 2016/0381651 | A1 | 12/2016 | Swinkels et al. |
| 2017/0149641 | A1 | 5/2017 | Hosie et al. |

OTHER PUBLICATIONS

Unknown, "Aggregator", Fuse ESB Enterprise, printed Jul. 16, 2018, 9 pages.
Search Report for GB1413977.8 dated Feb. 6, 2015, pp. 1-3.
IBM, List of IBM Patents and Patent Applications Treated as Related, Sep. 19, 2018, 2 pages.

* cited by examiner

PROVIDING DYNAMIC LATENCY IN AN INTEGRATION FLOW

BACKGROUND

One or more aspects relate to the field of integration flows. In particular, one or more aspects relate to providing dynamic latency in integration flows.

An enterprise service bus (ESB) is a software architecture model used for designing and implementing communication between mutually interacting software applications in a service-oriented architecture (SOA). As a software architectural model for distributed computing, it is a specialty variant of the more general client server model and promotes agility and flexibility with regards to communication between applications.

Integration flows typically integrate two or more applications and are constructed by connecting multiple integration nodes together. A common integration pattern is an aggregation. In such a pattern, an incoming message enters an aggregation node (such as a fan out node) which may then send the message down multiple paths or may propagate the message down the same path multiple times.

An aggregation design pattern enables a single inbound request to map into multiple outbound service invocations, the responses from which can be aggregated into a single response to the original request. Aggregation design patterns are often utilized in ESB solutions to implement applications processing batch requests. These are often deployed to systems processing real time traffic and can have a negative impact on the responsiveness of the applications serving the requests.

In typical batch processing applications, the logic and messages are complex. Potentially, a single message may be several MB (megabytes) in size and result in hundreds of iterations, each with database inserts or invocations of external services, for example. Processing these can have a significant impact on other applications running within the same process.

Current solutions include throttling the batch processing applications by restricting the thread pool the batch runs in. Other solutions use workload placement of batch processing applications on separate processes (for example, additional cluster/cluster member).

SUMMARY

Shortcomings of the prior art are overcome and additional advantages are provided through the provision of a computer-implemented method of providing dynamic latency in an integration flow. The computer-implemented method includes managing an integration flow connecting multiple integration nodes and including at least one repeat node, wherein a repeat node repeats by sending one of a message, a variation of a message, or an element of a message to multiple paths or to a single path multiple times; registering one repeat node of the at least one repeat node for monitoring with a workload manager component; collecting data relating to an effect on performance by the integration flow including the one repeat node; determining one of latencies or variations of latencies between firing of repeats of the one repeat node based on the collected data; and instructing the one of the latencies or variations of latencies between firing of the repeats of the one repeat node to influence dynamically a flow of elements through the one repeat node.

Computer program products and computer systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1:
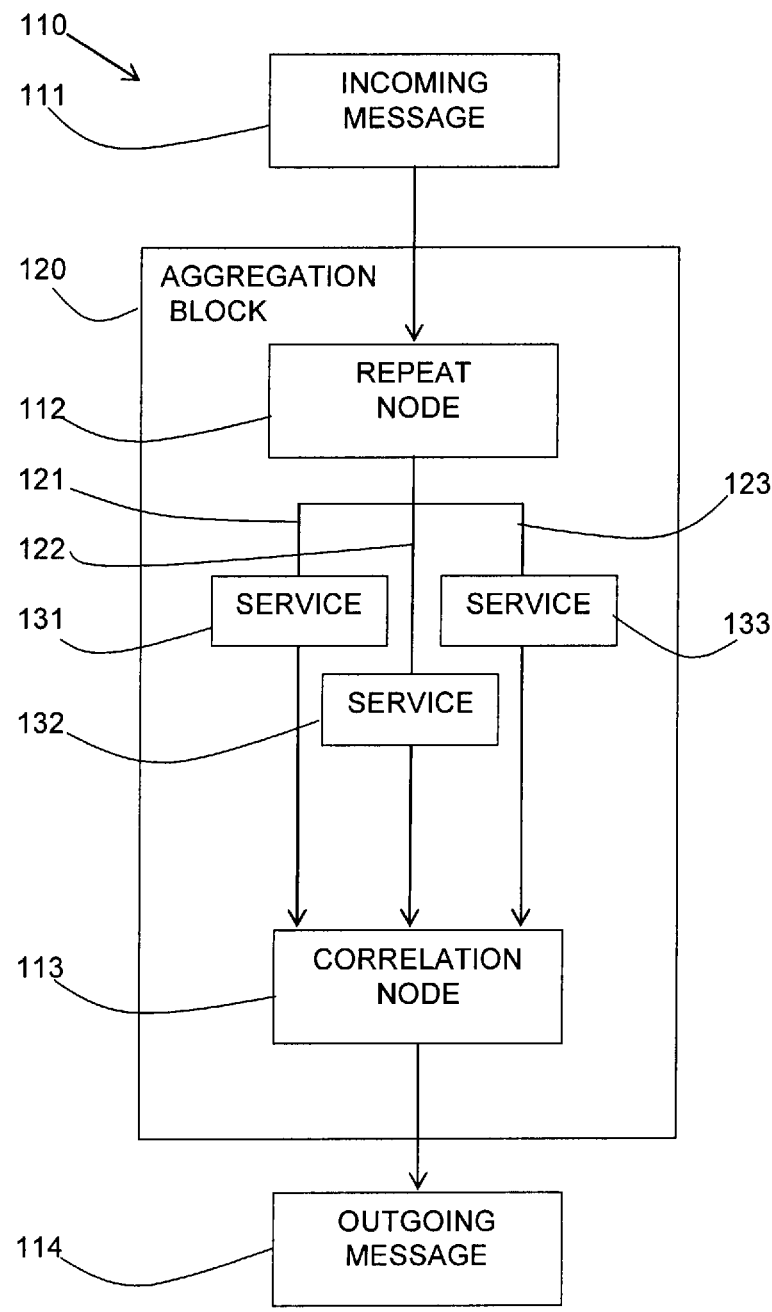
FIG. 1 is a schematic diagram of an embodiment of an integration flow in accordance with an aspect of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of aspects of the invention. However, it will be understood by those skilled in the art that aspects of the present invention may be practiced without these specific details. In other instances, well-known methods, procedures, and components have not been described in detail so as not to obscure aspects of the present invention.

A method and system are provided for introducing a point of reference or registration in an integration flow at an aggregation node to enable a workload management component to restrict the impact of batch processing applications. An aggregation node is a form of a repeat node in that it carries out repeat processing of an element. The term "repeat node" is used herein to describe aggregation nodes and other forms of nodes or primitives which carry out repeat processing of elements. Different ESB products refer to such repeat nodes by different names, such as fan out nodes, for example.

The impact of batch processing applications may be restricted using the described method when real time traffic serving application responsiveness approaches defined thresholds.

The described method proposes additional logic in a repeat node that can be influenced dynamically to introduce latency between firing of the output terminals.

Repeat nodes will often iterate over repeating elements and execute the same logic on each individual piece, possibly invoking a back end service with each discrete section of the incoming data.

A user may configure a repeat node to be able to be influenced by external code, such as workload management processes, which may then interrupt the iteration logic to essentially throttle the batch processing application when the service levels of real-time applications are being impacted.

This method may be applied to any repeat nodes including aggregation nodes which are iterative nodes or nodes with branching out terminals. One embodiment of an implementation is fan out nodes/primitives within mediation flows.

An extension to the described method may be that message priority is taken into account, such that a normal priority message may experience the defined latency (for example, 1 second) but a high priority message may only be exposed to a fraction of the defined latency or no latency dependency (for example, on a user defined policy).

Aspects of the described method enable repeat nodes such as iterative or branching nodes to be dynamically modified for workload management by external code to throttle batch processing work.

Referring to FIG. 1, a schematic diagram shows an example integration flow 110.

An integration flow typically integrates two of more applications and is constructed by connecting multiple integration nodes together. A common integration pattern is an aggregation in which messages are processed by an aggregation block 120. In such a pattern, an incoming message 111 or a modified incoming message enters a repeat node 112 which may then send the message, a modified version of the message, or elements of the message down multiple paths 121-123 perhaps invoking multiple service providers 131-133.

In another form of a repeat node, it may propagate the message, a modified version of the message, or elements of the message down the same path multiple times using different content from the data for each "fire" (for instance, an inbound "batch" message with hundreds of entries, each entry being sent to a database separately).

At the other end of the aggregation block 120, an optional correlation node 113 is used to correlate all the response messages into a single message 114.

A simple pseudo-code example of a repeat node in the form of a fan out node would be:

```
public class FanOut {
    public void process(Message request) {
        ...
        foreach Element repeatingElement : request {
            Message outputMessage = new Message(request);
            outputMessage.setAggregationContext(repeatingElement);
            outputTerminal.fire(outputMessage);
        }
        ...
    }
}
```

The described method provides the following example: the repeat node is registered with the workload manager (who is aware of this class of object) who can then modify the "sleepTime" through the notifyPropertyChange listener method. The amended code showing the described method is underlined:

```
public class FanOut extends Listener {
    private int sleepTime;
    static {
        WorkloadManager.register(this);   // Register with the workload manager
    }
    @Override
    public notifyPropertyChange(String name, Object value) {
        if name.equals("sleepTime") {
            this.sleepTime = ((Integer)value).getInt( );
        }
    }
    public void process(Message request) {
        ...
        foreach Element repeatingElement : request {
            Thread.sleep(sleepTime);
            Message outputMessage = new Message(request);
            outputMessage.setAggregationContext(repeatingElement);
            outputTerminal.fire(outputMessage);
        }
        ...
    }
}
```

Figure 2:
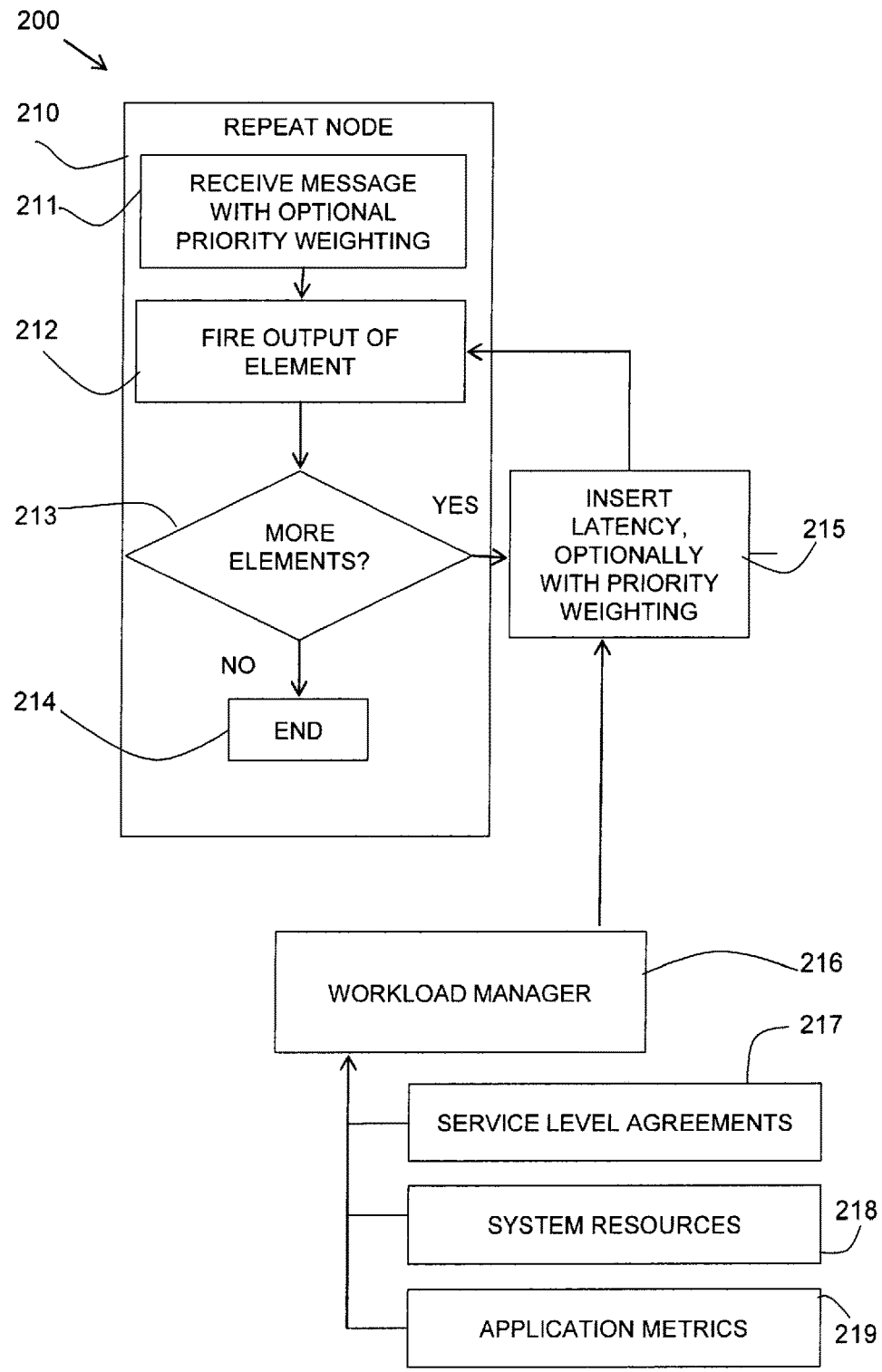
FIG. 2 is a flow diagram of an example embodiment of a method in accordance with an aspect of the present invention.

Referring to FIG. 2, a flow diagram 200 shows an embodiment of aspects of the described method.

A repeat node 210 (for example, an aggregation node) may be provided and may receive an incoming message 211, optionally including a priority weighting of the message. The repeat node 210 may fire an output 212 for an element of the message. The repeat node 210 may determine 213 if there are more elements to repeat by iteration or branching at the node. If there are no more elements, the process at the repeat node 210 ends 214.

The described process inserts a latency 215 for each repeat at the repeat node 210 which is applied to the fired output 212 for the element or message.

Optionally, a priority of a message may be obtained from the incoming message 211 and a priority weighting may be applied to the latency 215 for all elements of the message.

The latency 215 may be applied by a workload manager 216 which takes input from various components, such as service level agreements 217, system resources 218 and/or application metrics 219.

With regards to message priority, inbound messages may have a priority defined (for instance according to the Java Message Service (JMS) specification)—for example assume 1-5 (1 being the highest priority and 5 being the lowest priority). A sleepTime (latency) taking the priority into account may be defined as follows:

message latency=(priority/maxPriority)*sleepTime

For a 2 second defined "sleepTime" via the Workload Manager to manage resources/strain on the system, the priorities would experience the following latency between each record:

| Priority | Latency (s) |
|---|---|
| 1 | 0.4 |
| 2 | 0.8 |
| 3 | 1.2 |
| 4 | 1.6 |
| 5 | 2 |

Figure 3:
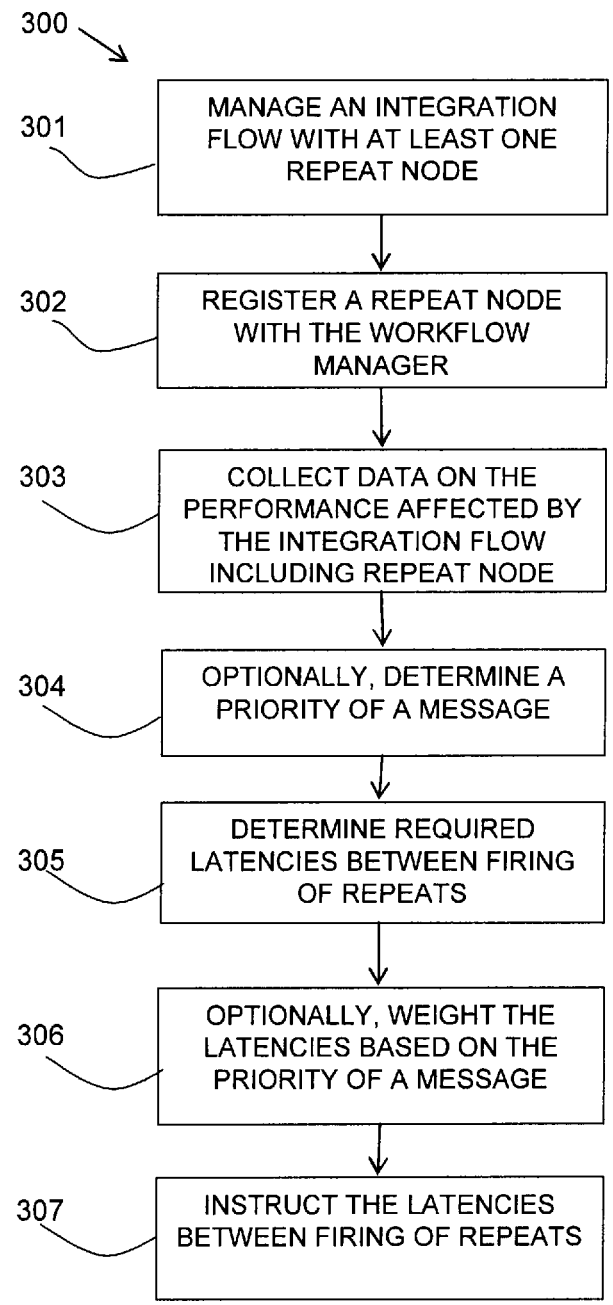
FIG. 3 is a flow diagram of an example embodiment of an aspect of a method in accordance with an aspect of the present invention.

Referring to FIG. 3, a flow diagram 300 shows an embodiment of aspects of a method as carried out at the workload manager.

A workload manager may manage 301 an integration flow with at least one repeat node which may be a branching node which repeats by sending an element to multiple paths or an iterating node which repeats by sending an element to a single path multiple times.

The workload manager may register 302 a repeat node for monitoring and may collect 303 data on the impact of the integration flow including the monitored repeat node. The impact may be the effect on performance by the integration flow. The data may be collected 303 from: applications or resources in the integration flow; co-located applications or resources, applications or resources downstream from the integration flow, for example, other applications on the system (i.e. the real time traffic serving applications) that may be effected by the batch processing due to shared system resources; service level agreements; and other sources.

Optionally, the workload manager may determine 304 a priority of an input message. Different elements of an input message would have the same priority. However, different messages may have different priorities.

The workload manager may determine 305 latencies (e.g., required latencies) between firing of repeats of the repeat node. The latencies may be determined to ensure the performance of a workflow which includes the repeat node. In one embodiment, it may be determined if a predetermined threshold is being approached in real time traffic serving application responsiveness.

Optionally, the latencies may be weighted 306 based on the priority of an incoming message. For example, Message 1 (priority 1) has a 0.4 second latency between fire operations of the output terminals for each repeat; however, Message 2 (priority 2) has a 0.8 second latency between each fire operation of the output terminals of each repeat.

The workload manager may instruct 307 the latencies or variation of an existing latency between firing of repeats in the repeat node. In one embodiment, the variation of latency between firing of repeats may be instructed by incrementing or decrementing a counter indicating applying more or less latency.

In one embodiment of the step 305 of determining latencies, the workload manager may be monitoring the service level agreements (SLA) of applications when a predetermined threshold is reached.

For example, the SLA that response times for application 1 be less than 1 second is only just being met, the threshold 90% of the SLA was passed and now the average latency is 0.9 seconds.

The workload manager determines that it is to try to improve the responsiveness of "application 1" to bring the response times back down to a safer level. It happens that "batch application 2" started processing just as the response times from "application 1" started to increase. From the application and service level agreement monitoring it is possible to see the correlation between the "application 1" response times increasing and "batch application 2" starting to process messages. If there were more than one potential source of the increasing response times, the workload manager may instruct latency increments on more than one "batch application".

The workload manager may now increment the sleep time of the registered repeat node in "batch application 2" by a defined increment (100ms for instance). Additional subsequent increments may be provided depending on whether the instructed latency does not provide enough improvement to the response times on "application 1".

Similarly, if a lower threshold is met (i.e. application 1 response time drops below 0.5 seconds), the workload manager may begin lifting/reducing instructed latencies on registered repeat nodes.

The system may also be able to learn over time what instructed latencies in particular repeat nodes have on real time traffic applications. For example, when system resources are w, and workload is x, increasing latency on a repeat node by y reduces the response time of application b by z. In this way, the system may learn over time what initial latencies to instruct under certain situations.

Figure 4:
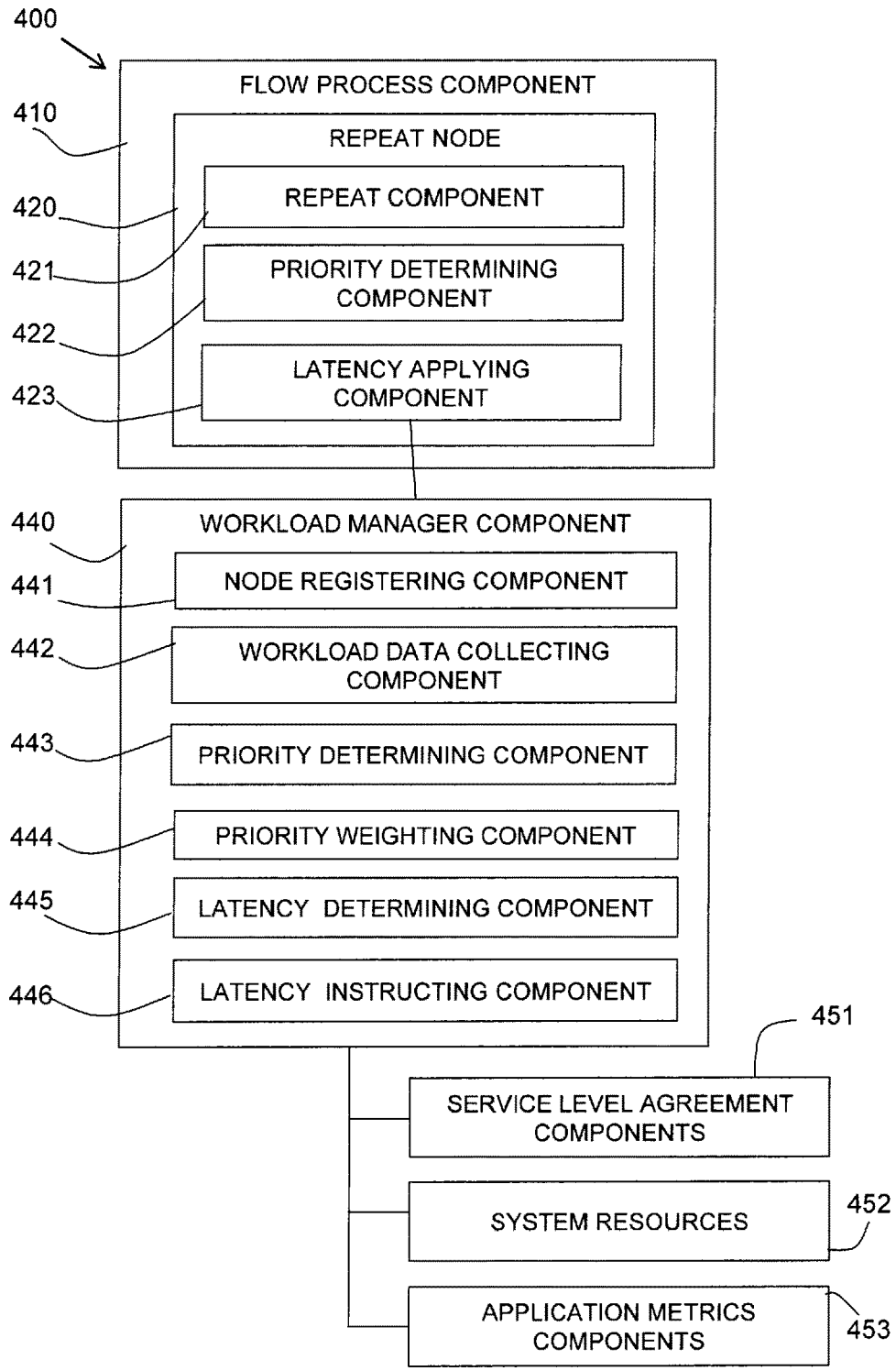
FIG. 4 is block diagram of an example embodiment of a system in accordance with an aspect of an aspect of the present invention.

Referring to FIG. 4, a block diagram shows an embodiment of aspects of the described system 400.

A flow process component 410 is shown with a repeat node 420. The repeat node 420 may include a repeat component 421 for determining if there is a next repeat of the process of the node. The repeat node 420 may also include a priority determining component 422 for determining a priority allocated to a message. The repeat node 420 may also include a latency applying component 423 for adding a latency to a specific repeat of the process.

The system 400 may include a workload manager component 440 which monitors and has input from various external components including, for instance, service level agreement components 451, system resources 452, and/or application metric components 453.

The workload manager component 440 may include a node registering component 441 for registering a repeat node 420 for monitoring and latency applying. A workload data collecting component 442 may collect data from the various external components being monitored.

The workload manager component 440 may include a priority determining component 443 for receiving a priority for a message from a priority determining component 422 of the repeat node 420. The workload manager component 440 may include a priority weighting component 444 for applying a priority weighting to determined latencies for the repeats of the repeat node 420.

The workload manager component 440 may also include a latency determining component 445 for determining a latency to be applied to a specific repeat at the repeat node 420. The latency determining component 445 may determine the latency for a specific repeat based on the inputs from the external components 451-453 and from the priority weighting component 444.

The workload manager component 440 may include a latency instructing component 446 which instructs the latency applying component 423 of the repeat node 420 of the determined latency for specific repeats at the repeat node.

The method is not limited to introducing latency when responsiveness of other co-located applications are being effected. It may also be utilized if downstream components are determined to be a bottleneck and can only service a certain throughput.

For example, if an external service being invoked is only able to service 1 message per second and if the request entering the aggregation block has 100 elements, then it may be beneficial to apply a 1 second latency between each iteration to limit the number of requests reaching the external service to 1 per second.

As described herein, in typical batch processing applications the logic and messages may be complex. A single message may be several MB in size and may result in hundreds of iterations, each with database inserts or invocations of external services, for example. Processing these can have a significant impact on other applications running within the same process or on the same or shared system. Aspects of the described method uses external code (for example, a workload management component) to detect this and to be able to influence the repeat node to introduce a latency (for example, 100 ms) enabling concurrently running applications to have more processor time and resources available to them, thereby improving their observed responsiveness.

Aspects of the described method and system address a technical problem of the impact of batch processing in integration flows on applications, particularly applications with real time traffic processing. Dynamically providing latencies in one or more repeat nodes in an integration flow can dynamically control the throughput of messages and the performance of applications in the integration flow.

Figure 5:
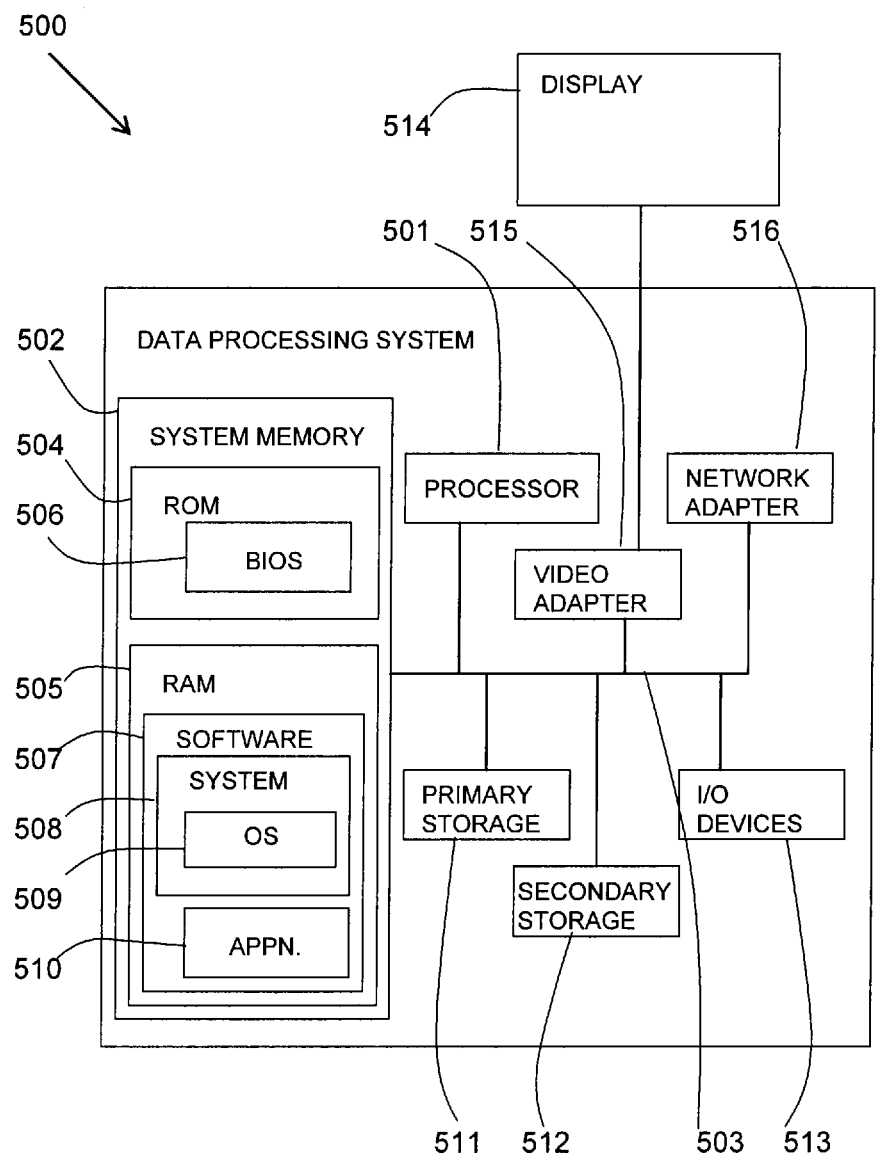
FIG. 5 is a block diagram of an embodiment of a computer system in which aspects of the present invention may be implemented.

Referring to FIG. 5, an example system for implementing aspects of the invention includes a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

As described herein, according to one aspect of the present invention, there is provided a method for providing dynamic latency in an integration flow carried out by a workload manager component, comprising: managing an integration flow connecting multiple integration nodes and including at least one repeat node, wherein a repeat node repeats by sending a message, a variation of a message, or an element of a message to multiple paths or to a single path multiple times; registering a repeat node for monitoring with the workload manager component; collecting data relating to the effect on performance by the integration flow including the monitored repeat node; determining latencies (e.g., required latencies) or variations of latencies between firing of repeats of the repeat node based on the collected data; and instructing the latencies or variations of latencies between firing of the repeats of the repeat node to influence dynamically a flow of elements through the repeat node.

The method may include: determining a priority of a repeat of a repeat node based on a priority of an incoming message; and weighting the latency for the repeats for the message based on the priority.

The determining the latencies or variations of latencies may be based on the impact of repeats of the repeat node on applications as determined by the collected data. The applications may be in the integration flow or in other integration flows. The determining the latencies or variations of latencies may be additionally or alternatively based on the impact of repeats of the repeat node on components downstream of the integration flow as determined by the collected data.

The collecting the data on the effect on performance may collect data from one or more of: system resources, including applications or resources in the integration flow and in other integration flows, and applications or resources in systems effected by the repeat node, service level agreement components, and application metrics.

The workload manager component may be an external component and instructing a latency may provide additional code to the repeat node.

The collecting the data relating to the effect on performance by the integration flow including the monitored repeat node, and the determining latencies between firing of repeats of the repeat node based on the collected data may include: determining if one or more applications in a system or downstream of the system is reaching a predefined threshold of performance; and instructing latencies in repeats of the repeat node for one or more applications. The method may also include learning correlations between instructed latencies in a particular repeat node and the effect on performance of applications. The applications may be real time traffic serving applications and thresholds are set in service level agreements.

In one embodiment, the integration flow is an aggregation pattern and the repeat node is an aggregation node. The repeat node may be an aggregation node with branching or iterating repeats.

The instructing the latencies may interrupt repeats of a repeat node to throttle batch processing to provide a regulated flow of elements.

According to another aspect of the present invention, there is provided a system for providing dynamic latency in an integration flow, comprising: an integration flow connecting multiple integration nodes and including at least one repeat node, wherein a repeat node repeats by sending a message, a variation of a message, or an element of a message to multiple paths or to a single path multiple times; a workload manager component including: a node registering component for registering the repeat node for monitoring with the workload manager component; a workload data collecting component for collecting data relating to the effect on performance by the integration flow including the monitored repeat node; a latency determining component for determining latencies (e.g., required latencies) or variations of latencies between firing of repeats of the repeat node based on the collected data; and a latency instructing component for instructing latencies or variations of latencies between firing of the repeats of the repeat node to influence dynamically a flow of elements through the repeat node.

The workload manager component may include: a priority determining component for determining a priority of a repeat of a repeat node based on a priority of an incoming message; and a priority weighting component for weighting the latency for the repeats for the message based on the priority.

The latency determining component may determine latencies or variations of latencies based on the impact of repeats of the repeat node on applications. The latency determining component may also or alternatively determine latencies or variations of latencies based on the impact of repeats of the repeat node on components downstream of the integration flow.

The workload data collecting component may collect information from one or more of: system resources, including applications or resources in the integration flow or in other integration flows, and applications or resources in systems effected by the repeat node, service level agreement components, and application metrics.

The workload manager component may be an external component and the latency instructing component may instruct latencies by providing additional code to the repeat node.

In one embodiment, the integration flow may be an aggregation pattern and the repeat node is an aggregation node. The repeat node may be an aggregation node with branching or iterating repeats.

According to yet another aspect of the present invention, there is provided a computer program product for providing dynamic latency in an integration flow, the computer program product comprising: a computer readable storage medium readable by a processing circuit and storing instructions for execution by the processing circuit for performing a method according to one aspect of the present invention.

According to other aspects of the present invention, there is provided a method substantially as described with reference to the figures, and a system substantially as described with reference to the figures.

The described aspects of the invention enable workload management products to restrict the impact of batch processing applications when real time traffic serving application responsiveness approaches defined thresholds.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), aportable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of aspects of the present invention.

What is claimed is:

1. A computer-implemented method comprising:
    managing an integration flow connecting multiple integration nodes and including a first repeat node, wherein the first repeat node repeats by sending an element of a message to a path multiple times;
    determining a latency between firing of repeats of the first repeat node based on data collected form the first repeat node, wherein the latency comprises a first time;
    determining a priority of a first repeat of the first repeat node based on a priority of an incoming message;
    weighting the latency for the repeats for the incoming message based on the priority, wherein weighting the latency based on the priority further comprises:
        multiplying a first ratio by a delay time to generate a weighted latency having a second time, wherein the first ratio is based on a numerator comprising the priority of the incoming message and a denominator comprising a lowest priority for incoming messages; and
    instructing the weighted latency between firing of the repeats of the first repeat node to influence a flow of elements through the first repeat node, and wherein instructing the weighted latency causes the repeat node to delay, by the second time, respective sendings of the element of the incoming message to the path.

2. The method of claim 1, further comprising registering the first repeat node for monitoring with a workload manager component.

3. The method of claim 1, wherein the determining the latency is based on an impact of repeats of the first repeat node on applications as determined by data collected from the first repeat node.

4. The method of claim 1, wherein the determining the latency is based on an impact of repeats of the repeat node on components downstream of the integration flow as determined by data collected from the first repeat node.

5. The method of claim 1, wherein data collected from the first repeat node comprises data from resources in the integration flow, and resources in systems effected by the first repeat node.

6. The method of claim 1, wherein data collected from the first repeat node comprises data from applications in the integration flow and application metrics.

7. The method of claim 1, wherein the instructing the weighted latency comprises providing additional code to the first repeat node.

8. The method of claim 1, wherein determining the latency further comprises:
    determining that an application is reaching a predefined threshold of performance; and
    instructing latencies in repeats of the first repeat node for the application.

9. The method of claim 8, wherein the method further comprises learning correlations between instructed latencies in the first repeat node and an effect on performance of applications.

10. The method of claim 8, wherein the application is a real time traffic serving application, and wherein the predefined threshold is set in a service level agreement.

11. The method of claim 1, wherein the integration flow is an aggregation pattern and the first repeat node is an aggregation node with repeats selected from the group consisting of:
    branching repeats, and iterating repeats.

12. A computer system comprising:
    a memory; and
    a processor in communication with the memory, wherein the computer system is configured to perform a method, the method comprising:
        managing an integration flow connecting multiple integration nodes and including a first repeat node, wherein the first repeat node repeats by sending an element of a message to a path multiple times;
        determining a latency between firing of repeats of the first repeat node based on data collected form the first repeat node, wherein the latency comprises a first time;
        determining a priority of a first repeat of the first repeat node based on a priority of an incoming message;
        weighting the latency for the repeats for the incoming message based on the priority, wherein weighting the latency based on the priority further comprises:
            multiplying a first ratio by a delay time to generate a weighted latency having a second time, wherein the first ratio is based on a numerator comprising the priority of the incoming message and a denominator comprising a lowest priority for incoming messages; and
        instructing the weighted latency between firing of the repeats of the first repeat node to influence a flow of elements through the first repeat node, and wherein instructing the weighted latency causes the repeat node to delay, by the second time, respective sendings of the element of the incoming message to the path.

13. The system of claim 12, the method further comprising registering the first repeat node for monitoring with a workload manager component.

14. The system of claim 12, wherein the determining the latency is based on an impact of repeats of the first repeat node on applications as determined by data collected from the first repeat node.

15. The system of claim 12, wherein the determining the latency is based on an impact of repeats of the repeat node on components downstream of the integration flow as determined by data collected from the first repeat node.

16. The system of claim 12, wherein data collected from the first repeat node comprises data from resources in the integration flow, and resources in systems effected by the first repeat node.

17. The system of claim 12, wherein data collected from the first repeat node comprises data from applications in the integration flow and application metrics.

18. The system of claim 12, wherein the instructing the weighted latency comprises providing additional code to the first repeat node.

19. The system of claim 12, wherein determining the latency further comprises:
    determining that an application is reaching a predefined threshold of performance; and
    instructing latencies in repeats of the first repeat node for the application.

20. A computer program product comprising a computer readable storage medium readable by a processing circuit and storing instructions for execution by the processing circuit for performing a method comprising:
    managing an integration flow connecting multiple integration nodes and including a first repeat node, wherein the first repeat node repeats by sending an element of a message to a path multiple times;
    determining a latency between firing of repeats of the first repeat node based on data collected form the first repeat node, wherein the latency comprises a first time;
    determining a priority of a first repeat of the first repeat node based on a priority of an incoming message;
    weighting the latency for the repeats for the incoming message based on the priority, wherein weighting the latency based on the priority further comprises:
        multiplying a first ratio by a delay time to generate a weighted latency having a second time, wherein the first ratio is based on a numerator comprising the priority of the incoming message and a denominator comprising a lowest priority for incoming messages; and
    instructing the weighted latency between firing of the repeats of the first repeat node to influence a flow of elements through the first repeat node, and wherein instructing the weighted latency causes the repeat node to delay, by the second time, respective sendings of the element of the incoming message to the path.

* * * * *